(12) United States Patent
Hossan et al.

(10) Patent No.: US 6,776,929 B2
(45) Date of Patent: Aug. 17, 2004

(54) METHOD OF FORMING A CONDUCTIVE THERMOPLASTIC COMPOSITION

(75) Inventors: Robert Hossan, Delmar, NY (US); Don Robert Roden, Jr., Glenmont, NY (US); Sai-Pei Ting, Slingerlands, NY (US)

(73) Assignee: General Electric Company, Pittsfield, MA (US)

( * ) Notice: Subject to any disclaimer, the term of this patent is extended or adjusted under 35 U.S.C. 154(b) by 334 days.

(21) Appl. No.: 10/063,058

(22) Filed: Mar. 15, 2002

(65) Prior Publication Data

US 2002/0149006 A1 Oct. 17, 2002

(51) Int. Cl.$^7$ ............................. H01B 1/24; C08K 3/04; C08L 53/00

(52) U.S. Cl. .................. 252/511; 524/495; 523/324; 264/105

(58) Field of Search .................... 252/511; 264/104, 264/105; 524/495, 496; 523/324; 525/68, 69, 89

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,512,606 A | 6/1950 | Bolton et al. |
| 3,195,868 A | 7/1965 | Loomans et al. |
| 3,257,357 A | 6/1966 | Stamanoff |
| 3,257,358 A | 6/1966 | Stamanoff |
| 3,306,874 A | 2/1967 | Hay |
| 3,306,875 A | 2/1967 | Hay |
| 3,428,699 A | 2/1969 | Schleimer |
| 3,756,999 A | 9/1973 | Stetter et al. |
| 3,822,227 A | 7/1974 | Hermann et al. |
| 3,876,721 A | 4/1975 | Yasui et al. |
| 3,884,882 A | 5/1975 | Caywood, Jr. |
| 3,914,266 A | 10/1975 | Hay |
| 4,011,200 A | 3/1977 | Yonemitsu et al. |
| 4,028,341 A | 6/1977 | Hay |
| 4,038,343 A | 7/1977 | Yonemitsu et al. |
| 4,054,612 A | 10/1977 | Yagi et al. |
| 4,147,740 A | 4/1979 | Swiger et al. |

(List continued on next page.)

FOREIGN PATENT DOCUMENTS

| | | |
|---|---|---|
| EP | 0153074 A2 | 2/1985 |
| EP | 0627466 A2 | 5/1994 |
| EP | 0 685 527 A | 12/1995 |
| EP | 0 866 098 A | 9/1998 |
| EP | 0 936 237 A | 8/1999 |
| WO | WO 01/36536 A1 | 5/2001 |
| WO | WO 03 040224 A | 5/2003 |

OTHER PUBLICATIONS

Gallucci et al., "Preparation and Reactions of Epoxy–Modified Polyethylene", J. Appl. Poly. Sci., vol. 27, pp. 425–437 (1982).

Primary Examiner—Mark Kopec (57) ABSTRACT

A conductive thermoplastic composition is prepared by a method in which poly (arylene ether) and, optionally, a portion of polyamide are added to a first feed port, polyamide is added to a second feed port, and a concentrate of conductive carbon black in polyamide is added to the second feed port or a third feed port. Whereas preparation of conductive poly(arylene ether)/polyamide compositions has typically required an extruder having at a screw length to diameter ratio of at least 40, the present method allows the use of extruders having a screw length to diameter ratio less than 38 and as low as 20 or lower. The conductive thermoplastic composition prepared by the method exhibits high conductivity and high impact strength, and it is useful for molding articles such as electrostatically-paintable automotive exterior panels.

30 Claims, 3 Drawing Sheets

U.S. PATENT DOCUMENTS

| | | | |
|---|---|---|---|
| 4,174,358 A | 11/1979 | Epstein | |
| 4,251,644 A | 2/1981 | Joffrion | |
| 4,315,086 A | 2/1982 | Uenon et al. | |
| 4,346,194 A | 8/1982 | Roura | |
| 4,474,927 A | 10/1984 | Novak | |
| 4,600,741 A | 7/1986 | Aycock et al. | |
| 4,642,358 A | 2/1987 | Aycock et al. | |
| 4,742,115 A | 5/1988 | Mawatari et al. | |
| 4,752,135 A | 6/1988 | Loomans | |
| 4,806,297 A | 2/1989 | Brown et al. | |
| 4,806,602 A | 2/1989 | White et al. | |
| 4,826,933 A | 5/1989 | Grant et al. | |
| 4,927,894 A | 5/1990 | Brown | |
| 4,935,472 A | 6/1990 | Brown et al. | |
| 4,974,307 A | 12/1990 | Uebayashi et al. | |
| 4,980,424 A | 12/1990 | Sivavec | |
| 5,041,504 A | 8/1991 | Brown et al. | |
| 5,115,042 A | 5/1992 | Khouri et al. | |
| 5,484,838 A | 1/1996 | Helms et al. | |
| 5,591,382 A | 1/1997 | Nahass et al. | |
| 5,593,227 A | 1/1997 | Scheuring et al. | |
| 5,843,340 A * | 12/1998 | Silvi et al. | 252/511 |
| 5,932,159 A | 8/1999 | Rauwendaal | |
| 5,977,240 A | 11/1999 | Fortujn | |
| 6,116,770 A | 9/2000 | Kiani et al. | |
| 6,171,523 B1 * | 1/2001 | Silvi et al. | 252/511 |
| 6,221,283 B1 | 4/2001 | Koevoets et al. | |
| 6,352,654 B1 * | 3/2002 | Silvi et al. | 252/511 |
| 6,627,701 B2 * | 9/2003 | Adedeji et al. | 525/68 |

\* cited by examiner

FIG. 1

[PRIOR ART]

METHOD OF FORMING A CONDUCTIVE THERMOPLASTIC COMPOSITION

BACKGROUND OF INVENTION

Poly(arylene ether) resins have been modified with polyamide resins to provide a wide variety of beneficial properties such as heat resistance, chemical resistance, impact strength, hydrolytic stability, and dimensional stability compared to either unmodified resin alone. When a conductive agent, such as conductive carbon black, is incorporated into poly (arylene ether)/polyamide (PAE/PA) compositions, electrically conductivities suitable for electrostatic painting may be achieved.

A variety of methods have been described for preparing conductive PAE/PA compositions. U.S. Pat. No. 5,843,340 to Silvi et al. generally describes preparation of conductive PAE/PA compositions having excellent ductility by melt blending polyphenylene ether, an unsaturated impact modifying polymer and a functionalizing compound in an initial step, optionally in combination with a portion of the polyamide, and subsequently melt blending with the remainder of the polyamide and conductive carbon black having a low volatiles content.

U.S. Pat. No. 5,977,240 to Marie Lohmeijer et al. generally describes a thermoplastic composition comprising (a) a compatibilized PAE/PA base resin, and (b) 1–7 parts by weight per 100 parts by weight of (a) of an electroconductive carbon black. The composition is prepared by first forming the compatibilized PAE/PA base resin, then adding the electroconductive carbon black.

U.S. Pat. No. 6,171,523 to Silvi et al. generally describes a method for the preparation of conductive PAE/PA compositions having excellent ductility, the method comprising melt blending polyphenylene ether, an unsaturated impact modifying polymer and a functionalizing compound in an initial step, optionally in combination with a portion of the polyamide, and subsequently melt blending with the remainder of the polyamide and conductive carbon black having a low volatiles content.

U.S. Pat. No. 6,221,283 to Dharmarajan et al. generally describes a method of making a conductive thermoplastic composition containing at least one dispersed phase polymer with a continuous phase polymer and at least one conductivity imparting agent wherein the bulk resistivity of the composition is at least partially determined by the particle size of the dispersed phase within the continuous phase. The thermoplastic composition preferably comprises a compatibilized blend of at least one polyphenylene ether resin, at least one polyamide resin, and at least one conductivity imparting agent, and optionally, one or more of impact modifiers, stabilizers, antioxidants, lubricants, and fillers.

PAE/PA compositions are typically manufactured using a single-screw or twin-screw extruder characterized by a screw length and a screw diameter. Existing manufacturing methods for PAE/PA compositions having desirable properties typically require an extruder having at least twelve barrels and a screw length to diameter ratio of at least 40. Such extruders require so much space that it is difficult to accommodate them in many manufacturing facilities. There is a need for a PAE/PA preparation method that allows the use of more compact extruders.

SUMMARY OF INVENTION

The above-described and other drawbacks and disadvantages are alleviated by a method of preparing a conductive thermoplastic composition, comprising: adding to a first feed port of an extruder about 20 to about 70 parts by weight of a poly(arylene ether) and 0 to about 20 parts by weight of a first polyamide; adding to a second feed port of the extruder about 20 to about 75 parts by weight of a second polyamide, wherein the second feed port is downstream of the first feed port; and adding to the second feed port or a third feed port of the extruder about 5 to about 40 parts by weight of a concentrate comprising about 5 to about 20 weight percent of a conductive carbon black and about 80 to about 95 weight percent of a third polyamide, wherein the third feed port is downstream of the second feed port; wherein the extruder has a screw length to diameter ratio less than 38.

Other embodiments, including methods utilizing particular poly(arylene ether) and polyamide resins, and methods utilizing additional components in the conductive thermoplastic composition, are described in detail below.

DETAILED DESCRIPTION

One embodiment is a method of preparing a conductive thermoplastic composition, comprising: adding to a first feed port of an extruder about 20 to about 70 parts by weight of a poly(arylene ether) and 0 to about 20 parts by weight of a first polyamide; adding to a second feed port of the extruder about 20 to about 75 parts by weight of a second polyamide, wherein the second feed port is downstream of the first feed port; and adding to the second feed port or a third feed port of the extruder about 5 to about 40 parts by weight of a concentrate comprising about 5 to about 20 weight percent of a conductive carbon black and about 80 to about 95 weight percent of a third polyamide, wherein the third feed port is downstream of the second feed port; wherein the extruder has a screw length to diameter ratio less than 38. The screw length to diameter ratio is preferably less than 35, more preferably less than 33, still more preferably less than 30, even more preferably less than 27, yet more preferably less than 22.

The present inventors have discovered that PAE/PA compositions having excellent properties can be prepared using extruders having twelve or fewer barrels and/or a screw length to diameter ratio less than 38 when the conductive carbon black is added in the form of a concentrate in polyamide. The present inventors have further discovered particular mixing conditions may be employed in preferred embodiments that produce the PAE/PA compositions using an extruder having a screw length to diameter ratio less than 35, more preferably less than 33, still more preferably less than 30, even more preferably less than 27, yet more preferably less than 22.

Figure 1:
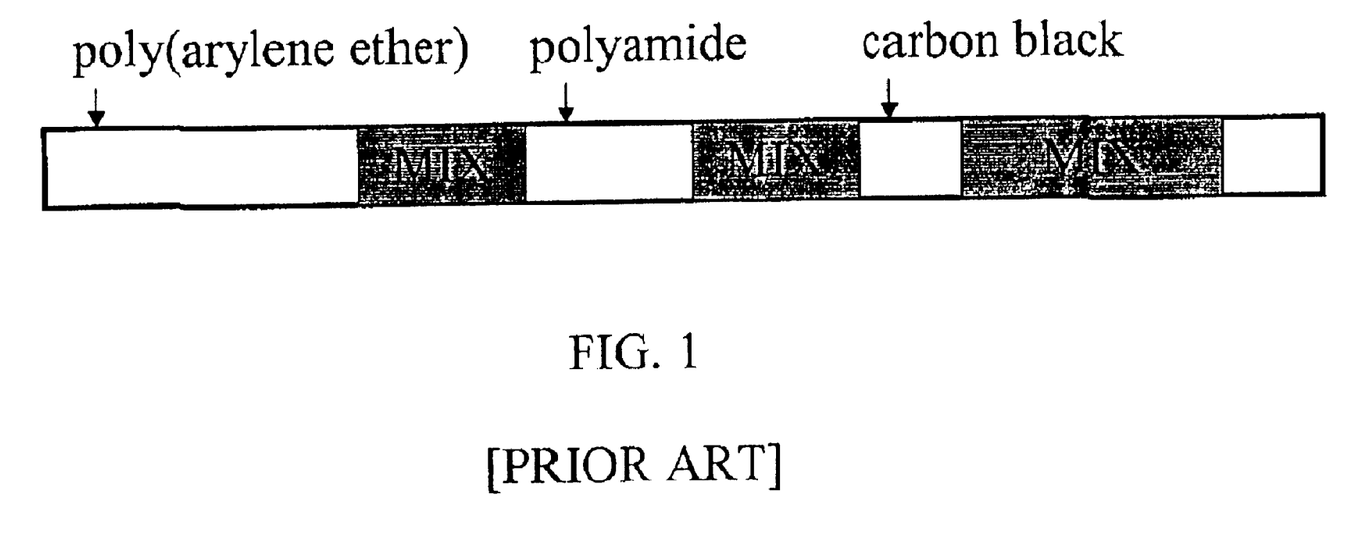
FIG. 1 is a simplified diagrammatic view of a conventional extruder configuration used for the preparation of a conductive thermoplastic composition.

FIG. 1 is a simplified diagram illustrating a conventional extruder used for preparing a conductive thermoplastic composition. A poly(arylene ether), optionally in combination with a portion of polyamide and/or one or more additional components, is added via a first port and mixed in a first mixing section composed of screw elements typically used for melting and distributive mixing. A polyamide is then added via a second feedport, and further mixing occurs in a second mixing section similar to the first mixing section. A conductive carbon black, optionally in combination with additional polyamide, is added in a third feedport and further mixing occurs in a third mixing section designed for intense dispersive mixing. Although specific barrels are not shown in the figure, conventional methods typically require a total of at least 12 barrels in the extruder and a screw length to diameter ratio of at least 40. The ratio of screw length to diameter is a measure of the compactness of an extruder design, with lower values corresponding to a more compact design.

Figure 2:
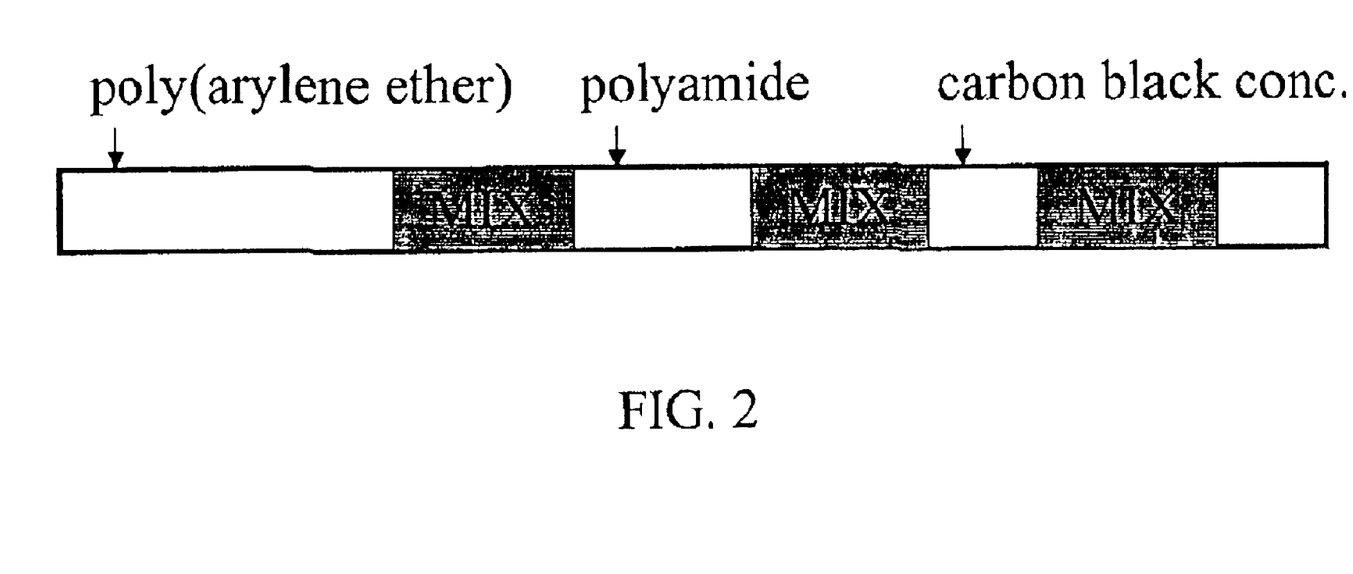
FIG. 2 is a simplified diagrammatic view of an extruder configuration used for a first embodiment of the method.

FIG. 2 is a simplified diagram illustrating an extruder suitable for use in a first embodiment of the method. A poly(arylene ether), optionally in combination with a portion of polyamide and/or one or more additional components, is added via a first port and mixed in a first mixing section composed of screw elements typically used for melting and distributive mixing. A polyamide is then added via a second feedport, and further mixing occurs in a second mixing section similar to the first mixing section. A concentrate comprising conductive carbon black and polyamide is added in a third feedport and further mixing occurs in a third mixing section designed for only moderate distributive mixing. Addition of the conductive carbon black as a concentrate in polyamide enables the third mixing section to be shortened compared to the third mixing section in FIG. 1. The extruder can therefore use 11 or fewer barrels and have a screw length to diameter ratio less than 38. An extruder with as few as 9 barrels and/or a screw length to diameter ratio of around 26 may be used in this embodiment.

Figure 3:
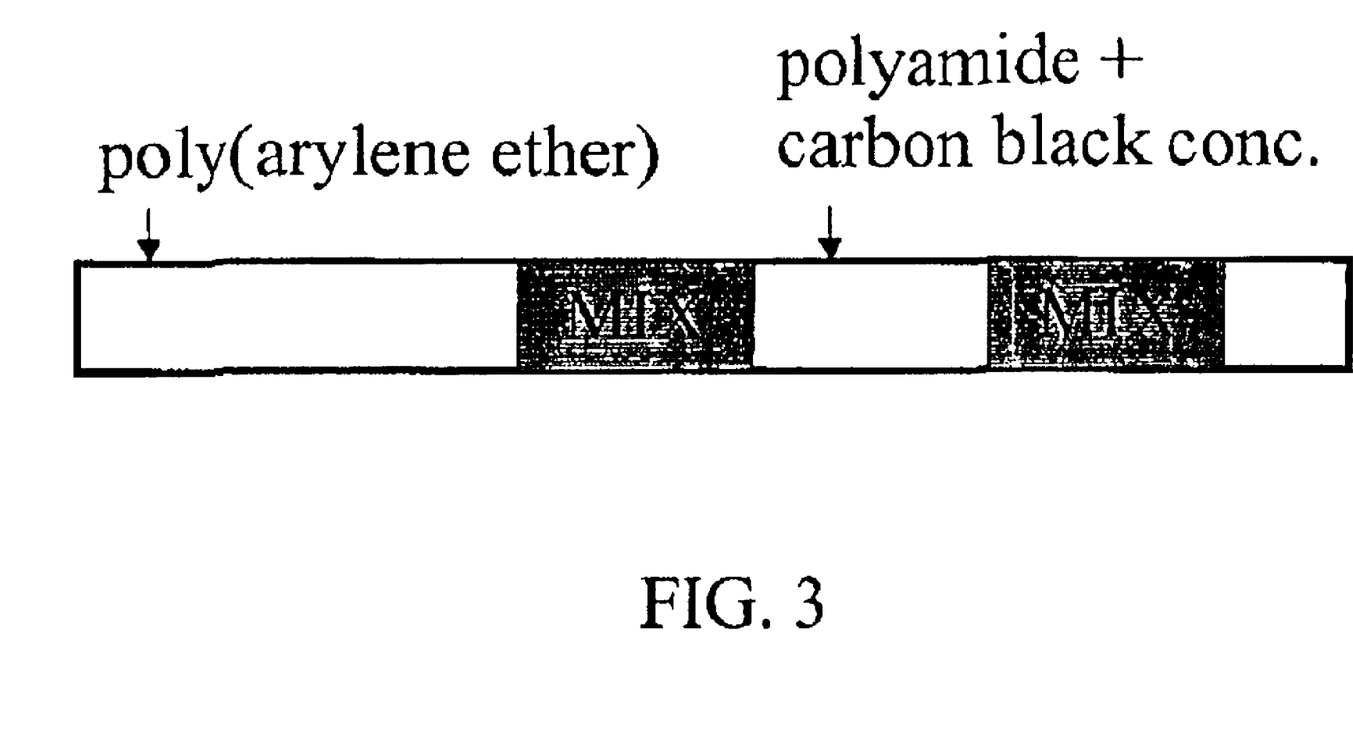
FIG. 3 is a simplified diagrammatic view of an extruder configuration used for a second embodiment of the method.

FIG. 3 is a simplified diagram illustrating an extruder suitable for use in a second embodiment of the method. A poly(arylene ether), optionally in combination with a portion of polyamide and/or one or more additional components, is added via a first port and mixed in a first mixing section composed of screw elements typically used for melting and distributive mixing. A polyamide and a concentrate comprising conductive carbon black and polyamide are then added via a second feedport, and further mixing occurs in a second mixing section similar to the first mixing section. Addition of the polyamide and the conductive concentrate to the second feed port allows the elimination of the third feed port and the third mixing section shown in FIG. 1. Addition of the conductive carbon black as a concentrate also reduces the mixing required after all components have been added. An extruder with as few as 7 barrels and/or a screw length to diameter ratio of around 20 may be used in this embodiment.

Extruders suitable for performing the method are known in the art and commercially available from, for example, Werner & Pfleiderer. Suitable extruders may include so-called super-compounding extruders, which are characterized by extra deep screws.

There is no particular limitation on the design of the individual mixing elements. Suitable mixing elements include, for example, mixing elements on each of the shafts which are in radial interwiping relation within the extruder barrel and configured to wipe one another and the cylinder walls, as described in U.S. Pat. No. 4,752,135; mixing element disks having mixing wings as described in U.S. Pat. No. 3,195,868 to Loomans et al. and U.S. Pat. No. 5,593,227 to Scheuring et al.; mixing elements having two opposing lobes wherein one lobe is tapered, as described in U.S. Pat. No. 6,116,770 to Kiani et al.; and the various mixing elements described in U.S. Pat. No. 5,932,159 to Rauwendaal.

The method may utilize any poly(arylene ether). The term poly(arylene ether) includes polyphenylene ether (PPE) and poly(arylene ether) copolymers; graft copolymers; poly (arylene ether) ether ionomers; and block copolymers of alkenyl aromatic compounds, vinyl aromatic compounds, and poly(arylene ether), and the like; and combinations comprising at least one of the foregoing; and the like. Poly(arylene ether) resins are known polymers comprising a plurality of structural units of the formula wherein for each structural unit, each $Q^1$ is independently halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms; and each $Q^2$ is independently hydrogen, halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms. Preferably, each $Q^1$ is alkyl or phenyl, especially $C_{1-4}$ alkyl, and each $Q^2$ is independently hydrogen or methyl.

Both homopolymer and copolymer poly(arylene ether) resins are included. The preferred homopolymers are those comprising 2,6-dimethylphenylene ether units. Suitable copolymers include random copolymers comprising such units in combination with 2,3,6-trimethyl-1,4-phenylene ether units, which may be derived from, for example, copolymerization of 2,6-dimethylphenol with 2,3,6-trimethylphenol. Also included are poly(arylene ether) resins containing moieties prepared by grafting vinyl monomers or polymers such as polystyrenes, as well as coupled poly(arylene ether) resins in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether) resins of the present invention further include combinations of any of the above.

The poly(arylene ether) generally has a number average molecular weight of about 3,000 to about 40,000 atomic mass units (AMU) and a weight average molecular weight of about 20,000 to about 80,000 AMU, as determined by gel permeation chromatography. The poly(arylene ether) generally may have an intrinsic viscosity of about 0.2 to about 0.6 deciliters per gram (dL/g) as measured in chloroform at 25° C. Within this range, the intrinsic viscosity may preferably be up to about 0.5 dL/g. Also within this range, the intrinsic viscosity may preferably be at least about 0.3 dL/g. It is also possible to utilize a high intrinsic viscosity poly(arylene ether) and a low intrinsic viscosity poly(arylene ether) in combination. Determining an exact ratio, when two intrinsic viscosities are used, will depend on the exact intrinsic viscosities of the poly (arylene ether) resins used and the ultimate physical properties desired.

The poly(arylene ether) resins are typically prepared by the oxidative coupling of at least one monohydroxyaromatic compound such as 2,6-xylenol or 2,3,6-trimethylphenol. Catalyst systems are generally employed for such coupling;

they typically contain at least one heavy metal compound such as a copper, manganese or cobalt compound, usually in combination with various other materials. Examples of catalyst systems and methods for preparing polyphenylene ethers are described in, for example, U.S. Pat. Nos. 3,306,874, 3,306,875, 3,914,266 and 4,028,341 to Hay; U.S. Pat. Nos. 3,257,357 and 3,257,358 to Stamatoff; U.S. Pat. Nos. 4,011,200 and 4,038,343 to Yonemitsu et al.; U.S. Pat. No. 4,742,115 to Mawatari et al.; U.S. Pat. Nos. 4,806,297 and 4,935,472 to Brown et al.; U.S. Pat. No. 4,806,602 to White et al; European Patent Application No. 153,074 A2 to Kawaki et al.; and European Patent Application No. 627,466 A2 to Campbell et al.

Particularly useful poly(arylene ether) resins for many purposes include those that comprise molecules having at least one aminoalkyl-containing end group. The aminoalkyl radical is typically located in an ortho position relative to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of the aminoalkyl-containing and 4-hydroxybiphenyl end groups.

The method comprises adding about 20 to about 70 parts by weight of the poly (arylene ether) to the first feed port. Within this range, it may be preferred to use a poly(arylene ether) amount of at least about 25 parts by weight, more preferably at least about 30 parts by weight. Also within this range, it may be preferred to use a poly(arylene ether) amount of up to about 60 parts by weight, more preferably up to about 50 parts by weight.

The method may utilize any polyamide as the first polyamide, the second polyamide, and the third polyamide. The first polyamide, the second polyamide, and the third polyamide may be the same or different from each other. Suitable polyamides include those comprising repeating structural units of the formula wherein $R^1$ and $R^2$ are independently $C_2$–$C_{12}$ alkylene.

Typical examples of polyamides (nylons) useful in conductive compositions include, for example, polyamide-4,6, polyamide-6, polyamide-6,6, polyamide-11, polyamide-12, polyamide-6,3, polyamide-6,4, polyamide-6,10, and polyamide-6,12, as well as polyamides prepared from terephthalic acid and/or isophthalic acid and trimethyl hexamethylene diamine, polyamides prepared from adipic acid and meta xylylenediamines, polyamides prepared from adipic acid and/or azelaic acid and 2,2-bis-(p-aminocyclohexyl) propane, semi-crystalline polyamides resulting from combinations of terephthalic and/or isophthalic and/or adipic acids with hexamethylene diamine, semi-crystalline polyamides prepared from terephthalic and/or isophthalic acids and hexamethylene diamine and 2-methyl pentamethylene diamine, and polyamides prepared from terephthalic acid and 4,4'-diamino-dicyclohexylmethane. Mixtures and/or copolymers of two or more of the foregoing polyamides may also be used.

It is also understood that use of the term "polyamide" includes the toughened or super tough polyamides. Super tough polyamides or super tough nylons, as they are more commonly known, are available commercially, e.g., from E.I. duPont under the tradename ZYTEL® ST, or may be prepared according to methods described in, for example, U.S. Pat. No. 4,174,358 to Epstein, U.S. Pat. No. 4,474,927 to Novak, U.S. Pat. No. 4,346,194 to Roura, and U.S. Pat. No. 4,251,644 to Joffrion. These super tough nylons are prepared by blending one or more polyamides with one or more polymeric or copolymeric elastomeric toughening agents. Suitable toughening agents are disclosed in the above-identified U.S. patents, as well as in U.S. Pat. No. 3,884,882 to Caywood, Jr., and U.S. Pat. No. 4,147,740 to Swiger; and Gallucci et al., "Preparation and Reactions of Epoxy-Modified Polyethylene", *J. Appl. Poly. Sci., Vol.* 27, pp. 425–437 (1982). Typically, these elastomeric polymers and copolymers may be straight chain or branched as well as graft polymers and copolymers, including core-shell graft copolymers, and they are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer.

In a preferred embodiment, the first polyamide, the second polyamide, and the third polyamide each independently comprise polyamide-6, polyamide-6,6, or a mixture thereof. In a highly preferred embodiment, the second polyamide comprises polyamide-6 and polyamide-6,6. In another highly preferred embodiment, the third polyamide comprises polyamide-6,6.

In a preferred embodiment, at least a portion of the poly(arylene ether) and the first polyamide may be provided in the form of a recycled poly(arylene ether)/polyamide composition. In particular, recycled scrap from the manufacturing a non-conductive poly(arylene ether)/polyamide composition may be used as a source of the poly(arylene ether) and the first polyamide. Such a recycled source may account for up to about 50 weight percent of the poly (arylene ether) and up to about 100 weight percent of the first polyamide.

The method comprises adding 0 to about 20 parts by weight of the first polyamide to the first feed port. Within this range, it may be preferred to use a first polyamide amount of up to about 10 parts by weight, more preferably up to about 5 parts by weight.

The method comprises adding about 20 to about 75 parts by weight of the second polyamide to the second feed port. Within this range, it may be preferred to use a second polyamide amount of at least about 25 parts by weight, more preferably at least about 30 parts by weight. Also within this range, it may be preferred to use a second polyamide amount of up to about 60 parts by weight, more preferably up to about 50 parts by weight, yet more preferably up to about 40 parts by weight.

The method comprises adding to a third feed port of the extruder about 5 to about 40 parts by weight of a concentrate comprising about 3 to about 25 weight percent of a conductive carbon black and about 75 to about 97 weight percent of a third polyamide, where weight percents of the conductive carbon black and the third polyamide are based on the total weight of the concentrate.

Preferred conductive carbon blacks include those having an average particle size less than about 200 nanometers (nm), preferably less than about 100 nm, more preferably less than about 50 nm. Preferred conductive carbon blacks may have a surface area greater than about 200 square meter per gram ($m^2/g$), preferably greater than about 400 $m^2/g$, yet more preferably greater than about 1000 $m^2/g$. Preferred conductive carbon blacks may have a pore volume (measured by dibutyl phthalate absorption) greater than about 40 cubic centimeters per hundred grams (cm$^3$/100 g), preferably greater than about 100 cm$^3$/100 g, more preferably greater than about 150 cm$^3$/100 g. Exemplary conductive carbon blacks include the carbon black commercially available from Columbian Chemicals under the trade name CONDUCTEX® the acetylene black available from Chevron Chemical, under the trade names S.C.F. (Super Conductive Furnace) and E.C.F. (Electric Conductive Furnace); the carbon blacks available from Cabot Corporation under the trade names VULCAN® XC72, XC305, and XC605; and the carbon blacks commercially available from Akzo Co. Ltd under the trade names KETJEN BLACK® EC 300, EC 600, and 600 JD. The conductive carbon black may be used in an amount of about 0.5 to about 5 weight percent, based on the total weight of the composition. Within this range, it may be preferred to use a conductive carbon black amount of at least about 1.0 weight percent, more preferably at least about 1.5 weight percent. Also within this range, it may be preferred to use a carbon black amount of up to about 4 weight percent, more preferably up to about 3 weight percent, even more preferably up to about 2 weight percent, still more preferably up to about 1.8 weight percent.

The concentrate may comprise about 5 to about 20 weight percent of conductive carbon black, based on the total weight of the concentrate. Within this range, it may be preferred to use a conductive carbon black amount of at least about 7 weight percent. Also within this range, it may be preferred to use a conductive carbon black amount of up to about 13 weight percent.

The concentrate may comprise about 80 to about 95 weight percent of the third polyamide, based on the total weight of the concentrate. Within this range, it may be preferred to use a third polyamide amount of at least about 87 weight percent. Also within this range, it may be preferred to use a third polyamide amount of up to about 93 weight percent.

In addition to the conductive carbon black and the third polyamide, the concentrate may, optionally, further comprise a dispersing aid. Suitable dispersing aids include the water-insoluble synthetic resins commercially available as, for example, POLYOXYTER® from PolyChem Alloy. When present, the dispersing aids may be present in an amount of about 0.1 to about 20 weight percent, based on the total weight of the concentrate. Within this range, the dispersing aid amount may preferably be at least about 1 weight percent, more preferably at least about 2 weight percent. Also within this range, the dispersing aid amount may preferably be up to about 15 weight percent, more preferably up to about 10 weight percent.

In a preferred embodiment, the method further comprises adding about 1 to about 26 parts by weight of an impact modifier to the first feed port. Within this range, it may be preferred to use an impact modifier amount of at least about 3 parts by weight, more preferably at least about 5 parts by weight, still more preferably at least about 10 parts by weight. Also within this range, it may be preferred to use an impact modifier amount of up to about 22 parts by weight, more preferably up to about 20 parts by weight, still more preferably up to about 18 parts by weight. Suitable impact modifiers include natural and synthetic elastomeric polymers, including the polymerization products of such monomers as olefins (e.g., ethylene, propylene, 1-butene and 4-methyl-1-pentene), alkenylaromatic monomers (e.g., styrene and alpha-methylstyrene), conjugated dienes (e.g., butadiene, isoprene, and chloroprene), and vinylic carboxylic acids and their derivatives (e.g., vinyl acetate, acrylic acid, alkylacrylic acids, alkyl acrylates such as methyl acrylate, alkyl methacrylates such as methyl methacrylate, and acrylonitrile). The polymerization products include homopolymers and random, block, radial block, graft, and core-shell copolymers, as well as combinations thereof.

Particularly useful impact modifiers include A-B (diblock) and A-B-A (triblock) copolymers of alkenyl aromatic compounds and conjugated diene compounds. Specific examples, of the alkenyl aromatic compounds include styrene, p-methylstyrene, alpha-methylstyrene, vinylxylenes, vinyltoluenes, vinylnaphthalenes, divinylbenzenes, bromostyrenes, chlorostyrenes, and the like, and combinations comprising at least one of the foregoing alkenyl aromatic compounds. Of these, styrene, alpha-methylstyrene, p-methylstyrene, vinyltoluenes, and vinylxylenes are preferred, with styrene being more preferred. Specific examples of the conjugated diene include 1,3-butadiene, 2-methyl-1,3-butadiene, 2,3-dimethyl-1,3-butadiene, 1,3-pentadiene, and the like. Preferred among them are 1,3-butadiene and 2-methyl-1,3-butadiene. The conjugated diene blocks may be partially or entirely hydrogenated, whereupon they may be represented as containing polyolefin blocks.

Examples of A-B and A-B-A block copolymers include styrene-butadiene diblock copolymers, styrene-(ethylene-propylene) diblock copolymers, styrene-isoprene diblock copolymers, alpha-methylstyrene-butadiene diblock copolymers, styrene-butadiene-styrene triblock copolymers, styrene-(ethylene-butylene)-styrene triblock copolymers, styrene-isoprene-styrene triblock copolymers, alpha-methylstyrene-butadiene-alpha-methylstyrene triblock copolymers, and the like, and combinations comprising at least one of the foregoing impact modifiers. The A-B and A-B-A block copolymers may preferably have a glass transition temperature ($T_g$) less than about −20° C., more preferably less than about −40° C. Such A-B and A-B-A block copolymers are available commercially as, for example, the styrene-(ethylene-propylene) diblock copolymer having a styrene content of 37 weight percent available from Kraton Polymers as KRATON® G1701; the styrene-(ethylene-butylene)-styrene triblock copolymer having a styrene content of 30 weight percent available from Kraton Polymers as KRATON® G1651; the styrene-(ethylene-propylene) diblock copolymer available from Kuraray as SEPTON® 1001; and the styrene-(ethylene-butylene)-styrene triblock copolymers available from Kuraray as SEPTON® 8006 and from Repsol as CALPRENE® 6170P. Other A-B and A-B-A block copolymers include those available under the tradename SOLPRENE® from Phillips Petroleum and under the tradename VECTOR® from Dexco.

Also suitable as impact modifiers are core-shell type graft copolymers and ionomer resins, which may be wholly or partially neutralized with metal ions. In general, the core-shell type graft copolymers have a predominantly conjugated diene or crosslinked acrylate rubbery core and one or more shells polymerized thereon and derived from monoalkenylaromatic and/or acrylic monomers alone or in combination with other vinyl monomers. Other impact modifiers include the above-described types containing units having polar groups or active functional groups, as well as miscellaneous polymers such as Thiokol rubber, polysulfide rubber, polyurethane rubber, polyether rubber (e.g., polypropylene oxide), epichlorohydrin rubber, ethylene-propylene rubber, thermoplastic polyester elastomers, thermoplastic ether-ester elastomers, and the like, as well as mixtures comprising any one of the foregoing. Specially preferred ionomer resins include those sold under the trade name SURLYN® by DuPont.

A combination of two or more of the above described impact modifiers may be used. In one embodiment, the composition comprises about 2 to about 26 parts by weight of an impact modifier selected from the group consisting styrene-(ethylene-butylene)-styrene triblock copolymers, styrene-(ethylene-propylene) diblock copolymers, and combinations comprising at least one of the foregoing impact modifiers.

In one embodiment, the impact modifier comprises a styrene-(ethylene-butylene)-styrene triblock copolymer, a styrene-(ethylene-propylene) diblock copolymer, a styrene-butadiene-styrene triblock copolymer, a styrene-(butadiene-butylene)-styrene triblock copolymer, a maleic anhydride-grafted ethylene-propylene-diene-monomer copolymer, an ethylene-propylene rubbers, or the like, or a combination comprising at least one of the foregoing impact modifiers.

In a preferred embodiment, the composition comprises a styrene-(ethylene-propylene) diblock copolymer and a styrene-(ethylene-butylene)-styrene triblock copolymer. In this embodiment, the styrene-(ethylene-propylene) diblock copolymer may be used in an amount of about 1 to about 13 parts by weight. Within this range, the styrene-(ethylene-propylene) diblock copolymer amount may preferably be at least about 4 parts by weight. Also within this range, the styrene-(ethylene-propylene) diblock copolymer amount may preferably be up to about 10 parts by weight. Also in this embodiment, the styrene-(ethylene-butylene)-styrene triblock copolymer may be used in an amount of about 1 to about 13 parts by weight. Within this range, the styrene-(ethylene-butylene)-styrene triblock copolymer amount may preferably be at least about 4 parts by weight. Also within this range, the styrene-(ethylene-butylene)-styrene triblock copolymer amount may preferably be up to about 10 parts by weight.

The method may, optionally, further comprise adding about 0.1 to about 5 parts by weight of a compatibilizing agent to the first feed port in order to improve the physical properties of the polyphenylene ether-polyamide resin blend, as well as to enable the use of a greater proportion of the polyamide component. Within this range, the compatibilizing agent amount may preferably be at least about 0.2 part by weight, more preferably at least about 0.3 part by weight, yet more preferably at least about 0.5 part by weight. Also within this range, it may be preferred to use a compatibilizing agent amounts up to about 2 parts by weight, more preferably up to about 1 part by weight.

When used herein, the expression "compatibilizing agent" refers to those polyfunctional compounds which interact with the polyphenylene ether, the polyamide, or, preferably, both. This interaction may be chemical (e.g. grafting) or physical (e.g. affecting the surface characteristics of the dispersed phases). In either case the resulting PAE/PA composition appears to exhibit improved compatibility, particularly as evidenced by enhanced impact strength, mold knit line strength and/or elongation.

Suitable compatibilizing agents include, for example, liquid diene polymers, epoxy compounds, oxidized polyolefin wax, quinones, organosilane compounds, polyfunctional compounds, and functionalized poly(arylene ether) resins obtained by reacting one or more of the previously mentioned compatibilizing agents with a poly (arylene ether).

Liquid diene polymers suitable for use as compatibilizing agents include homopolymers of a conjugated diene and copolymers of a conjugated diene with at least one monomer selected from other conjugated dienes; vinyl monomers, such as styrene and alpha-methyl styrene; olefins, such as ethylene, propylene, butene-1, isobutylene, hexene-1, octene-1, and dodecene-1, and mixtures thereof. The liquid diene polymers may have a number average molecular weight of about 150 atomic mass units (AMU) to about 10,000 AMU, preferably about 150 AMU to about 5,000 AMU. These homopolymers and copolymers can be produced by the methods described in, for example, U.S. Pat. Nos. 3,428,699, 3,876,721, and 4,054,612. Specific examples of liquid diene polymers include polybutadiene, polyisoprene, poly (1,3-pentadiene), poly(butadiene-isoprene), poly(styrene-butadiene), polychloroprene, poly(butadiene-alpha methylstyrene), poly(butadiene-styrene-isoprene), poly(butylene-butadiene), and the like, and combinations comprising at least one of the foregoing liquid diene polymers.

Epoxy compounds suitable for use as compatibilizing agents include epoxy resins produced by condensing polyhydric phenols (e.g., bisphenol-A, tetrabromobisphenol-A, resorcinol and hydroquinone) and epichlorohydrin; epoxy resins produced by condensing polyhydric alcohols (e.g., ethylene glycol, propylene glycol, butylene glycol, polyethylene glycol, polypropylene glycol, pentaerythritol and trimethylolethane and the like) and epichlorohydrin, glycidyl etherified products of monohydric alcohols and monohydric phenols, such as phenyl glycidylether, butyl glycidyl ether and cresyl glycidylether; glycidyl derivates of amino compounds, such as the diglycidyl derivate of aniline; epoxidized products of higher olefinic or cycloalkene, or natural unsaturated oils (e.g., soybean oil) as well as of the foregoing liquid diene polymers; combinations comprising at least one of the foregoing epoxy compounds; and the like.

Oxidized polyolefin waxes suitable for use as compatibilizing agents are well known and described, for example, in U.S. Pat. Nos. 3,756,999 and 3,822,227. Generally, these are prepared by an oxidation or suspension oxidation of polyolefin. An especially preferred oxidized polyolefin wax is "Hoechst Wachs".

Quinone compounds suitable for use as compatibilizing agents are characterized as having at least one six-membered carbon ring; at least two carbonyl groups, which may be in the same or different six-membered carbon rings, provided that they occupy positions corresponding to the 1,2- or 1,4-orientation of the monocyclic quinone; and at least two carbon—carbon double bonds in the ring structure, the carbon—carbon double bounds and carbonyl carbon-oxygen double bonds being conjugated with respect to each other. Where more than one ring is present in the unsubstituted quinone, the rings may be fused, non-fused, or both: non-fused rings may be bound by a direct carbon—carbon double bond or by a hydrocarbon radical having conjugated unsaturation such as —C=C—C=C—.

The quinones may be substituted or unsubstituted. In substituted quinones, the degree of substitution may be from one to the maximum number of replaceable hydrogen atoms. Exemplary substituents include halogen (e.g. chlorine, bromine, fluorine, etc.), hydrocarbon radicals including branched and unbranched alkyl, cycloalkyl, olefinically unsaturated hydrocarbon radicals, aryl, alkylaryl, and halogenated derivatives thereof; and similar hydrocarbons having heteroatoms therein, particularly oxygen, sulfur, or phosphorous, and wherein the heteroatom connects the radical to the quinone ring (e.g., alkoxyl). Examples of specific quinones include 1,2-benzoquinone, 1,4-benzoquinone, 2,2'-diphenoquinone, 4,4'-diphenoquinone, 2,2',6,6'-tetramethyl-4,4'-diphenoquinone, 1,2- naphthoquinone, 1,4-naphthoquinone, 2,6-naphthoquinone, chloranils, 2-chloro-1,4-benzoquinone, 2,6-dimethyl-1,4-benzoquinone, combinations comprising at least one of the foregoing quinones, and the like.

Organosilane compounds suitable as compatibilizing agents are characterized as having at least one silicon atom bonded to a carbon through an oxygen link and at least one carbon—carbon double bond or carbon—carbon triple bond and/or a functional group selected from an amine group or a mercapto group, provided that the functional group is not directly bonded to the silicon atom. In such compounds, the C–O—Si component is generally present as an alkoxyl or acetoxy group bonded directly to the silicon atom, wherein the alkoxy or acetoxy group generally has less than 15 carbon atoms and may also contain hetero atoms (e.g., oxygen). Additionally, there may also be more than one silicon atom in the compound, such multiple silicon atoms, if present, being linked through an oxygen link (e.g., siloxanes); a silicon—silicon bond; or a divalent hydrocarbon radical (e.g., methylene or phenylene groups); or the like. Examples of suitable organosilane compounds include gamma-aminopropyltriethoxysilane, 2-(3-cyclohexanyl) ethyltrimethoxysilane, 1,3-divinyltetraethoxysi lane, vinyl-tris-(2-methoxyethoxy)silane, 5-bicycloheptenyltriethoxysilane, and gamma-mercaptopropyltrimethoxysilane.

Polyfunctional compounds suitable as compatibilizing agents include three types. The first type of polyfunctional compounds are those having in the molecule both a carbon—carbon double bond or a carbon—carbon triple bond and at least one carboxylic acid, anhydride, amide, ester, imide, amino, epoxy, orthoester, or hydroxy group. Examples of such polyfunctional compounds include maleic acid, maleic anhydride, fumaric acid, glycidyl acrylate, itaconic acid, aconitic acid, maleimide, maleic hydrazide, reaction products resulting from a diamine and maleic anhydride, dichloro maleic anhydride, maleic acid amide, unsaturated dicarboxylic acids (e.g. acrylic acid, butenoic acid, methacrylic acid, ethylacrylic acid, pentenoic acid), decenoic acids, undecenoic acids, dodecenoic acids, linoleic acid, esters of the foregoing unsaturated carboxylic acids, acid amides of the foregoing unsaturated carboxylic acids, anhydrides of the foregoing unsaturated carboxylic acids, unsaturated alcohols (e.g. alkyl alcohol, crotyl alcohol, methyl vinyl carbinol, 4-pentene-1-ol, 1,4-hexadiene-3-ol, 3-butene-1,4-diol, 2,5-dimethyl-3-hexene-2,5-diol and alcohols of the formula $C_nH_{2n-5}OH$, $C_nH_{2n-7}OH$ and $C_nH_{2n-9}OH$, wherein n is a positive integer up to 30), unsaturated amines resulting from replacing from replacing the —OH group(s) of the above unsaturated alcohols with $NH_2$ groups, functionalized diene polymers and copolymers, and the like. Of these, two of the preferred compatibilizing agents for compositions of the present invention are maleic anhydride and fumaric acid.

The second group of polyfunctional compounds have both (a) a group represented by the formula (OR) wherein R is hydrogen or an alkyl, aryl, acyl, or carbonyl dioxy group, and (b) at least two groups each of which may be the same or different selected from carboxylic acid, acid halide, anhydride, acid halide anhydride, ester, orthoester, amide, imido, amino, and various salts thereof. Typical of this group of compatibilizers are the aliphatic polycarboxylic acids, acid esters and acid amides represented by the formula:

wherein R is a linear or branched chain, saturated aliphatic hydrocarbon of from 2 to 20, preferably 2 to 10, carbon atoms; $R^1$ is hydrogen or an alkyl, aryl, acyl or carbonyl dioxy group of 1 to 10, preferably 1 to 6, more preferably 1 to 4, carbon atoms, especially preferred is hydrogen; each $R^{II}$ is independently hydrogen or an alkyl or aryl group from 1 to 20 carbon atoms, preferably from 1 to 10 carbon atoms; each $R^{III}$ and $R^{IV}$ are independently hydrogen or an alkyl or aryl group of from 1 to 10, preferably from 1 to 6, most preferably 1 to 4, carbon atoms; m is equal to 1 and (n+s) is greater than or equal to 2, preferably equal to 2 or 3, and n and s are each greater than or equal to zero and wherein ($OR^I$) is alpha or beta to a carbonyl group and at least two carbonyl groups are separated by 2 to 6 carbon atoms. Obviously, $R^I$, $R^{II}$, $R^{III}$ and $R^{IV}$ cannot be aryl when the respective substituent has less than 6 carbon atoms.

Suitable polycarboxylic acids include, for example, citric acid, malic acid, agaricic acid, and the like, including the various commercial forms thereof, such as for example, the anhydrous and hydrated acids. Of these, citric acid is another of the preferred compatibilizing agents. Illustrative of esters useful herein include, for example, acetyl citrate and mono- and/or distearyl citrates and the like. Suitable amides useful herein include, for example, N,N'-diethyl citric acid amide, N-phenyl citric acid amide, N-dodecyl citric acid amide, N,N'-didodecyl citric acid amide, and N-dodecyl malic acid. Especially preferred derivates are the salts thereof, including the salts with amines and, preferably, the alkali and alkaline earth metal salts. Exemplary of suitable salts include calcium malate, calcium citrate, potassium malate, and potassium citrate.

The third group of polyfunctional compounds have both (a) an acid halide group, most preferably an acid chloride group and (b) at least one carboxylic acid, anhydride, ester, epoxy, orthoester, or amide group, preferably a carboxylic acid or anhydride group. Examples of compatibilizers within this group include trimellitic anhydride acid chloride, chloroformyl succinic anhydride, chloro formyl succinic acid, chloroformyl glutaric anhydride, chloroformyl glutaric acid, chloroacetyl succinic anhydride, chloroacetylsuccinic acid, trimellitic acid chloride, and chloroacetyl glutaric acid. Among these, trimellitic anhydride acid chloride is preferred. Furthermore, it is especially preferred that compatibilizers of this group be pre-reacted with at least a portion of the poly(arylene ether) whereby the compatibilizing agent is a poly(arylene ether)-functionalized compound.

Preferred compatibilizing agents include citric acid, maleic acid, maleic anhydride, malic acid, fumaric acid, and the like, and combinations comprising at least one of the foregoing compatibilizing agents.

The foregoing compatibilizing agents may be used alone or in various combinations of one another with another. Furthermore, they may be added directly to the melt blend or pre-reacted with either or both the polyphenylene ether and polyamide, as well as with other resinous materials employed in the preparation of the compositions of the present invention. With many of the foregoing compatibilizing agents, particularly the polyfunctional compounds, even greater improvement in compatibility is found where at least a portion of the compatibilizing agent is pre-reacted, either in the melt or in a solution of a suitable solvent, with all or a part of the polyphenylene ether. It is believed that such pre-reacting may cause the compatibilizing agent to react with the polymer and, consequently, functionalize the polyphenylene ether as noted above. For example, the polyphenylene ether may be pre-reacted with maleic anhydride to form an anhydride functionalized polyphenylene ether that has improved compatibility with the polyamide compared to a non-functionalized polyphenylene ether.

The method may, optionally, further comprise adding additives to the first feed port, the second feed port, or the third feed port. Such additives may include, for example, stabilizers, antioxidants, antiozonants, mold release agents, dyes, pigments, UV stabilizers, non-conductive fillers, viscosity modifiers, and the like, and combinations comprising at least one of the foregoing additives. It is generally preferred to add most additives to the first feed port with the poly(arylene ether) and, if present, the first polyamide. Those of ordinary skill in the art may select additives and determine suitable amounts and methods of addition without undue experimentation.

In one embodiment, the method comprises: adding to a first feed port of an extruder about 30 to about 45 parts by weight of a poly(arylene ether), 0 to about 10 parts by weight of a first polyamide, and 1 to about 26 parts by weight of an impact modifier; adding to a second feed port of the extruder about 25 to about 40 parts by weight of a second polyamide, wherein the second feed port is downstream of the first feed port; and adding to the second feed port or a third feed port of the extruder about 10 to about 30 parts by weight of a concentrate comprising about 5 to about 18 weight percent of a conductive carbon black and about 82 to about 95 weight percent of a third polyamide, wherein the third feed port is downstream of the second feed port; wherein the extruder has a screw length to diameter ratio less than 30.

In another embodiment, the method comprises: adding to a first feed port of an extruder about 33 to about 40 parts by weight of a poly(arylene ether) comprising 2,6-dimethyl-1,4-phenylene ether units, 2,3,6-trimethyl-1,4-phenylene ether units, or a combination thereof, about 4 to about 10 parts by weight of a styrene-butylene-styrene triblock copolymer, and about 4 to about 10 parts by weight of a styrene-(ethylene-propylene) diblock copolymer; adding to a second feed port of the extruder about 30 to about 35 parts by weight of a polyamide comprising polyamide-6 and polyamide-6,6; and about 16 to about 20 parts by weight of a concentrate comprising about 7 to about 13 weight percent of a conductive carbon black and about 87 to about 93 weight percent of polyamide-6,6; wherein the second feed port is downstream of the first feed port; wherein the extruder has a screw length to diameter ratio less than 27; and wherein the composition after extrusion exhibits a volume resistivity of up to about 1,000 kohm-cm and a notched Izod impact strength at 23° C. of at least about 40 kJ/m$^2$ measured according to ISO 180.

After molding, the conductive thermoplastic composition prepared by the method preferably exhibits a volume resistivity of up to about 10,000 kiloohm-centimeters (kohm-cm), more preferably up to about 1,000 kohm-cm, even more preferably up to about 100 kohm-cm. A detailed method for determination of volume resistivity in molded samples is provided in the examples.

After molding, the conductive thermoplastic composition prepared by the method preferably exhibits a notched Izod impact strength measured at 23° C. according to ISO 180 of at least about 15 kilojoules per meter-squared (kJ/m$^2$), more preferably at least about 30 kJ/m$^2$, even more preferably at least about 40 kJ/m$^2$, still more preferably at least about 50 kJ/m$^2$.

After molding, the conductive thermoplastic composition prepared by the method preferably exhibits a notched Izod impact strength measured at −30° C. according to ISO 180 of at least about 10 kJ/m$^2$, more preferably at least about 15 kJ/m$^2$, even more preferably at least about 18 kJ/m$^2$, even more preferably at least about 20 kJ/m$^2$.

Alternatively, the notched Izod impact strength may be expressed as a percent retention of the notched Izod impact strength exhibited by the corresponding composition without conductive carbon black. In this case, the composition may retain at least about 40%, preferably at least about 50%, more preferably at least about 60%, of the notched Izod impact strength exhibited at 23° C. by the corresponding composition without conductive carbon black.

After molding, the conductive thermoplastic composition prepared by the method preferably exhibits a Dynatup at maximum load measured at 23° C. and 5 miles per hour according to ASTM D3763 of at least about 20 foot-pounds (ft-lb), more preferably at least about 25 ft-lb, even more preferably at least about 30 ft-lb.

After molding, the conductive thermoplastic composition prepared by the method preferably exhibits a Dynatup at maximum load measured at −30° C. and 5 miles per hour according to ASTM D3763 of at least about 2 ft-lb, more preferably at least about 5 ft-lb, even more preferably at least about 7 ft-lb.

Alternatively, the Dynatup at maximum load may be expressed as a percent retention of the Dynatup at maximum load exhibited by the corresponding composition without conductive carbon black. In this case, the composition may retain at least about 70%, preferably at least about 80%, more preferably at least about 90% of the Dynatup at maximum load at 23° C. exhibited by the corresponding composition without conductive carbon black.

The conductive thermoplastic composition prepared by the method preferably exhibits a Vicat temperature measured at 120° C. per hour according to ISO 306 of at least about 320° C., more preferably at least about 340° C., even more preferably at least about 350° C.

The invention is further illustrated by the following non-limiting examples.

EXAMPLES 1–6, COMPARATIVE EXAMPLES 1–6

These examples and comparative examples illustrate the advantages of adding the conductive carbon black as a concentrate. All components were obtained commercially. The poly(arylene ether) was a poly(2,6-dimethyl-1,4-phenylene ether) obtained as PPO® 0.40 IV from General Electric Company. The polyamide-6,6 was obtained as PA 6,6 LOW IV/PX 1010 from Rhodia having an amine endgroup number of 51 milliequivalents/gram and a relative viscosity of about 126 measured at 4% in concentrated sulfuric acid. The polyamide-6 was obtained as TECHNYL® ASN 27/32-35 LC obtained from Rhodia having an amine endgroup of about 93 milliequivalents/gram, a reduced viscosity of about 123 milliliters/gram. The styrene-(ethylene-butylene) diblock copolymer was obtained as KRATON® G1701 from Kraton Polymers. The styrene-butylene-styrene triblock copolymer was obtained as KRATON® G1651 from Kraton Polymers. The hindered phenol antioxidant was obtained as IRGANOX® 1076 from Ciba-Geigy. The compatibilizer citric acid was obtained from Cargill. The stabilizers potassium iodide (KI) and cuprous iodide (CuI) were obtained from Ajay Chemicals. The conductive carbon black was obtained as KETJEN BLACK® 600 JD from Akzo having a bulk density of 110 kg/m$^3$ and a pore volume (DBP) of 495 mL/100 g.

A concentrate containing 10 weight percent conductive carbon black and 90 weight percent polyamide-6,6 concentrate was obtained from PolyChem Alloy.

All test blends were compounded using a Werner-Pfleiderer 30 millimeter twin-screw extruder with ten barrels and a screw length to diameter ratio of about 32. The temperatures of barrels 1–10 were 500-536-536-554-554-

554-554-554-554-554° F., respectively. The extruder was operated at 350 rotations per minute (rpm) and a throughput of 50 pounds per hour.

The poly(arylene ether), impact modifiers, compatibilizer, and stabilizers were dry-blended and added in the feed throat at barrel 1. Polyamide-6,6 and polyamide-6 were added in a side feed at barrel 7. For Examples 1–3, the concentrate was added in the side feed at barrel 7. For Comparative Examples 2–4, a dry-blended mixture of powdered polyamide-6,6 and conductive carbon black was added in the side feed at barrel 7. The compounded product was discharged through a typical stranding die, cooled in a water bath, and pelletized.

All samples were molded using a Van Dorn 85 ton press using an ISO specimen tool, a melt temperature of 290° C. a mold temperature of 100° C., an injection time of 3 seconds, a holding time of 10 seconds, and a cooling time of 20 seconds.

Specific volume resistivity was determined on the narrow parallel portion of a injection molded multipurpose test specimen. Tensile bars were carved at both ends with a knife and cooled in a freezer for 2 hours at −40° C. The pieces were cold fractured to obtain brittle fractures. Both ends were painted with silver paint and the resistance was measured with a multimeter. The read-out resistance was corrected for the dimensions of the piece (length, width and thickness) and reported as Specific Volume Resistivity, calculated according to the formula:

$$SVR = R_{meas} \times A/L$$

where SVR is the specific volume resistivity expressed in kiloohm-centimeters (kohm-cm), $R_{meas}$ is the measured resistance in kiloohms, A is the fracture area in square-centimeters, and L is the length between fractured surfaces in centimeters.

Vicat temperatures were measured according to ISO 306. Notched Izod impact strengths were measured at −30 and 23° C. according to ISO 180. Dynatup energies at maximum load were measured at −30 or 23° C. and 5 miles per hour according to ASTM D3763.

Comparative Example 4 had a composition similar to that of Comparative Example 3, but it was prepared using a 14 barrel extruder similar to that depicted in FIG. 1, with conductive carbon black added at a second downstream feed.

Compositions and properties are presented in Table 1. The data show that the impact strength of the nonconductive PAE/PA blend in Comparative Example 1 is significantly deteriorated by the addition of conductive carbon black, as evidenced by Comparative Examples 2, 3, and 5. Comparative Examples 2, 3, and 5 also achieved only moderate conductivity (volume resistivities of 16,922 to 17,684 kiloohm-cm). In comparison, Examples 1–3 prepared with conductive carbon black concentrate exhibited much better retention of impact strength and substantially higher conductivity (volume resistivity values of 6 to 108 kiloohm-cm) versus Comparative Examples 2, 3, and 5. Comparison of Example 2 with Comparative Example 4 shows that, for the same overall composition, Example 2 prepared with a ten barrel extruder using the present method exhibited a higher Vicat temperature, higher Izod impact strength, higher Dynatup impact strength, and comparable conductivity compared to Comparative Example 4 prepared using a 14 barrel extruder and a conventional method.

TABLE 1

| | C. Ex. 1 | Ex. 1 | C. Ex. 2 |
|---|---|---|---|
| FIRST FEED PORT | | | |
| poly(arylene ether) | 34.10 | 34.10 | 34.10 |
| KRATON ® G1701 | 8.00 | 8.00 | 8.00 |
| KRATON ® G1651 | 7.00 | 7.00 | 7.00 |
| citric acid | 0.70 | 0.70 | 0.70 |
| IRGANOX ® 1076 | 0.30 | 0.30 | 0.30 |
| KI, 50% in water | 0.10 | 0.10 | 0.10 |
| CuI | 0.01 | 0.01 | 0.01 |
| SECOND FEED PORT | | | |
| polyamide-6,6 | 38.00 | 23.60 | 33.00 |
| polyamide-6 | 10.00 | 10.00 | 10.00 |
| THIRD FEED PORT | | | |
| polyamide-6,6 (ground) | — | — | 5.00 |
| conductive carbon black | — | — | 1.60 |
| 10% CCB in polyamide-6,6 | — | 16.00 | — |
| PROPERTIES | | | |
| Vicat at 120° C./hour (° F.) | 345 | 355 | 355 |
| Izod Impact Strength at 23° C. (kJ/m²) | 69.8 | 47.5 | 21.9 |
| Izod Impact Strength at −30° C. (kJ/m²) | 26.0 | 17.7 | 11.7 |
| Dynatup Impact Strength at 23° C. (ft-lb) | 29.3 | 32.0 | 24.8 |
| Dynatup Impact Strength at −30° C. (ft-lb) | 29.7 | 6.7 | 0.9 |
| Specific Volume Resistivity (kohm-cm) | — | 108 | 17,630 |

| | Ex. 2 | C. Ex. 3 | C. Ex. 4 |
|---|---|---|---|
| FIRST FEED PORT | | | |
| poly(arylene ether) | 34.10 | 34.10 | — |
| KRATON ® G1701 | 8.00 | 8.00 | — |
| KRATON ® G1651 | 7.00 | 7.00 | — |
| citric acid | 0.70 | 0.70 | — |
| IRGANOX ® 1076 | 0.30 | 0.30 | — |
| KI, 50% in water | 0.10 | 0.10 | — |
| CuI | 0.01 | 0.01 | — |
| SECOND FEED PORT | | | |
| polyamide-6,6 | 21.80 | 33.00 | — |
| polyamide-6 | 10.00 | 10.00 | — |
| THIRD FEED PORT | | | |
| polyamide-6,6 (ground) | — | 5.00 | — |
| conductive carbon black | — | 1.80 | — |
| 10% CCB in polyamide-6,6 | 18.00 | — | — |
| PROPERTIES | | | |
| Vicat at 120° C./hour (° F.) | 361 | 359 | 358 |
| Izod Impact Strength at 23° C. (kJ/m²) | 53.7 | 17.0 | 17.3 |
| Izod Impact Strength at −30° C. (kJ/m²) | 19.8 | 9.7 | 10.9 |
| Dynatup Impact Strength at 23° C. (ft-lb) | 31.8 | 20.3 | 26.7 |
| Dynatup Impact Strength at −30° C. (ft-lb) | 9.4 | 0.7 | 6.1 |
| Specific Volume Resistivity (kohm-cm) | 21 | 16,922 | 6 |

| | Ex. 3 | C. Ex. 5 |
|---|---|---|
| FIRST FEED PORT | | |
| poly(arylene ether) | 34.10 | 34.10 |
| KRATON ® G1701 | 8.00 | 8.00 |
| KRATON ® G1651 | 7.00 | 7.00 |
| citric acid | 0.70 | 0.70 |
| IRGANOX ® 1076 | 0.30 | 0.30 |

TABLE 1-continued

| | | |
|---|---|---|
| KI, 50% in water | 0.10 | 0.10 |
| CuI | 0.01 | 0.01 |
| SECOND FEED PORT | | |
| polyamide-6,6 | 20.00 | 33.00 |
| polyamide-6 | 10.00 | 10.00 |
| THIRD FEED PORT | | |
| polyamide-6,6 (ground) | — | 5.00 |
| conductive carbon black | — | 2.00 |
| 10% CCB in polyamide-6,6 | 20.00 | — |
| PROPERTIES | | |
| Vicat at 120° C./hour (° F.) | 355 | 360 |
| Izod Impact Strength at 23° C. (kJ/m²) | 42.6 | 17.1 |
| Izod Impact Strength at −30° C. (kJ/m²) | 20.3 | 9.7 |
| Dynatup Impact Strength at 23° C. (ft-lb) | 30.1 | 22.9 |
| Dynatup Impact Strength at −30° C. (ft-lb) | 6.7 | 0.9 |
| Specific Volume Resistivity (kohm-cm) | 6 | 17,684 |

The examples show that the method provides a conductive thermoplastic composition exhibiting superior impact strength, and conductivity, while maintaining comparable heat resistance compared to compositions prepared without adding the conductive carbon black as a concentrate in polyamide.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

What is claimed is:

1. A method of preparing a conductive thermoplastic composition, comprising:
    adding to a first feed port of an extruder about 20 to about 70 parts by weight of a poly(arylene ether) and 0 to about 20 parts by weight of a first polyamide;
    adding to a second feed port of the extruder about 20 to about 75 parts by weight of a second polyamide, wherein the second feed port is downstream of the first feed port; and
    adding to the second feed port or a third feed port of the extruder about 5 to about 40 parts by weight of a concentrate comprising about 5 to about 20 weight percent of a conductive carbon black and about 80 to about 95 weight percent of a third polyamide, wherein the third feed port is downstream of the second feed port;
    wherein the extruder has a screw length to diameter ratio less than 38.

2. The method of claim 1, wherein the concentrate is added to the second feed port.

3. The method of claim 1, wherein the concentrate is added to the third feed port.

4. The method of claim 1, wherein the extruder has a screw length to diameter ratio less than 35.

5. The method of claim 1, wherein the extruder has a screw length to diameter ratio less than 30.

6. The method of claim 1, wherein the extruder has a screw length to diameter ratio less than 27.

7. The method of claim 1, wherein the poly(arylene ether) comprises a plurality of structural units of the formula wherein for each structural unit, each $Q^1$ is independently halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms; and each $Q^2$ is independently hydrogen, halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms.

8. The method of claim 7, wherein each $Q^1$ is methyl, and each $Q^2$ is independently hydrogen or methyl.

9. The method of claim 1, wherein the poly(arylene ether) has an intrinsic viscosity of about 0.2 to about 0.6 deciliters/gram as measured in chloroform at 25° C.

10. The method of claim 1, wherein about 30 to about 60 parts by weight of the poly(arylene ether) are added to the first feed port.

11. The method of claim 1, wherein the first polyamide, the second polyamide, and the third polyamide each comprise repeating structural units of the formula

—NH—R$^1$—NH—CO—R$^2$—CO— wherein $R^1$ and $R^2$ are independently $C_2$–$C_{12}$ alkylene.

12. The method of claim 1, wherein the first polyamide, the second polyamide, and the third polyamide each independently comprise polyamide-6, polyamide-6,6, or a mixture thereof.

13. The method of claim 1, wherein the second polyamide comprises polyamide-6 and polyamide-6,6.

14. The method of claim 1, wherein about 30 to about 35 parts by weight of the second polyamide are added to the second feed port.

15. The method of claim 1, wherein the third polyamide comprises polyamide-6,6.

16. The method of claim 1, wherein a portion of the poly(arylene ether) and a portion of the first polyamide are provided as a recycled poly(arylene ether)/polyamide composition.

17. The method of claim 1, wherein the conductive carbon black has an average particle size less than about 200 nanometers.

18. The method of claim 1, wherein the composition comprises up to about 1.8 weight percent of the conductive carbon black, based on the total weight of the composition.

19. The method of claim 1, wherein the concentrate comprises about 7 to about 13 weight percent of the conductive carbon black.

20. The method of claim 1, further comprising adding about 1 to about 26 parts by weight of an impact modifier to the first feed port.

21. The method of claim 20, wherein the impact modifier is selected from the group consisting styrene-(ethylene-butylene)-styrene triblock copolymers, styrene-(ethylene-propylene) diblock copolymers, styrene-butadiene-styrene triblock copolymers, styrene-(butadiene-butylene)-styrene triblock copolymers, maleic anhydride-grafted ethylene-propylene-diene-monomer copolymers, ethylene-propylene rubbers, and combinations comprising at least one of the foregoing impact modifiers.

22. The method of claim 1, further comprising adding about 0.1 to about 5 parts by weight of a compatibilizer to the first feed port.

23. The method of claim 22, wherein the compatibilizer is selected from the group consisting of citric acid, maleic acid, maleic anhydride, malic acid, fumaric acid, and combinations comprising at least one of the foregoing compatibilizing agents.

24. The method of claim 1, wherein the composition after molding exhibits a volume resistivity of up to about 10,000 kiloohm-centimeters.

25. The method of claim 1, wherein the composition after molding exhibits a notched Izod impact strength measured at 23° C. according to ISO 180 of at least about 15 kilojoules per meter-squared.

26. The method of claim 1, wherein the composition after molding exhibits a notched Izod impact strength measured at 23° C. according to ISO 180 at least 40% as great as that of the corresponding composition without conductive carbon black.

27. The method of claim 1, wherein the composition after molding exhibits a Dynatup energy at maximum load measured at 23° C. and 5 miles per hour according to ASTM D3763 of at least about 20 foot-pounds.

28. The method of claim 1, wherein the composition after molding exhibits a Dynatup energy at maximum load measured at 23° C. and 5 miles per hour according to ASTM D3763 at least 70% as great as that of the corresponding composition without conductive carbon black.

29. A method of preparing a conductive thermoplastic composition, comprising:

adding to a first feed port of an extruder about 30 to about 45 parts by weight of a poly(arylene ether), 0 to about 10 parts by weight of a first polyamide, and 1 to about 26 parts by weight of an impact modifier;

adding to a second feed port of the extruder about 25 to about 40 parts by weight of a second polyamide, wherein the second feed port is downstream of the first feed port; and adding to the second feed port or a third feed port of the extruder about 10 to about 30 parts by weight of a concentrate comprising about 5 to about 18 weight percent of a conductive carbon black and about 82 to about 95 weight percent of a third polyamide, wherein the third feed port is downstream of the second feed port;

wherein the extruder has a screw length to diameter ratio less than 33.

30. A method of preparing a conductive thermoplastic composition, comprising:

adding to a first feed port of an extruder about 33 to about 40 parts by weight of a poly(arylene ether) comprising 2,6-dimethyl-1,4-phenylene ether units, 2,3,6-trimethyl-1,4-phenylene ether units, or a combination thereof, about 4 to about 10 parts by weight of a styrene-butylene-styrene triblock copolymer, and about 4 to about 10 parts by weight of a styrene-(ethylene-propylene) diblock copolymer;

adding to a second feed port of the extruder about 30 to about 35 parts by weight of a polyamide comprising polyamide-6 and polyamide-6,6; and about 16 to about 20 parts by weight of a concentrate comprising about 7 to about 13 weight percent of a conductive carbon black and about 87 to about 93 weight percent of polyamide-6,6; wherein the second feed port is downstream of the first feed port;

wherein the extruder has a screw length to diameter ratio less than 27; and wherein the composition after extrusion exhibits a volume resistivity of up to about 1,000 kohm-cm and a notched Izod impact strength at 23° C. of at least about 40 kJ/m$^2$ measured according to ISO 180.

* * * * *